United States Patent Office 3,372,182
Patented Mar. 5, 1968

3,372,182
PROCESS FOR PREPARATION OF STABLE, FREE RADICAL NITROXIDES
Arthur Kentaro Hoffmann, New Canaan, Conn., Ernestine Gelblum Abraham, Cumberland, Md., and Allan Murry Feldman, Norwalk, Conn., assignors to American Cyanamid Company, Stamford, Conn., a corporation of Maine
No Drawing. Filed Apr. 27, 1965, Ser. No. 451,315
6 Claims. (Cl. 260—465.5)

This invention relates to a novel process for preparing stable, free radical nitroxides of the formula:

(I)

wherein $R^{10}$ and $R^{11}$ are as hereinafter defined.

It has now been discovered that a great variety of N,N-disubstituted, stable, free radical nitroxides not otherwise readily available may be prepared by a simple and convenient process which comprises pyrolyzing in an inert reaction medium virtually any hydroxylamine which is susceptible to cleavage of the O—C bond as, for example, in tri-t-butylhydroxylamine:

$$\text{t}-(CH_3)_3C-\underset{\underset{\text{O}-C(CH_3)_3-\text{t}}{|}}{N}-O-C(CH_3)_3-\text{t}$$

The hydroxylamines generally susceptible to O—C bond cleavage by the process of the invention are N,N,O-trisubstituted hydroxylamines. Such hydroxylamines may be represented by the general formula:

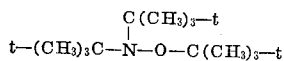
(II)

wherein $R^{10}$ is selected from the group consisting of

wherein:

$R^1$, $R^2$ and $R^3$ are alkyl;
$R^4$ and $R^5$ are selected from the group consisting of alkyl, phenyl and halogen-substituted phenyl;
$R^6$ is selected from the group consisting of —CN, —COOR$^7$, —CONH$_2$, halogen, —SR$^8$ and —OR$^9$;

wherein:

$R^7$ is selected from the group consisting of alkyl and phenyl;
$R^8$ is selected from the group consisting of —CN, —COCH$_3$, phenyl,

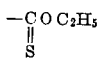

and

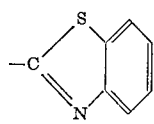

and
$R^9$ is selected from the group consisting of —COCH$_3$ and —COC$_2$H$_5$;
and wherein $R^{11}$ is selected from the group consisting of $R^{10}$ and phenyl.

Alkyl in the above definitions includes radicals having from one to fifteen carbon atoms, inclusive, particularly one to eight carbon atoms, such as methyl, ethyl, propyl, butyl, etc., to and including pentadecyl. Halogen includes fluorine, chlorine and bromine. All of such values for $R^{10}$ and $R^{11}$ thus include groups which are nonreactive in the formation of product (I) by thermal decomposition according to the invention.

Although the above hydroxylamine Formula II encompasses numerous compounds it should be understood that the invention may be practiced with any substituted hydroxylamine which is not so stable that it can resist cleavage of the O—C bond when heated in an inert atmosphere. It will further be appreciated that the O—C hydroxylamine bond may have more or less stability towards pyrolysis depending on the particular substituted hydroxylamine chosen. The degree of stability, however, is not a limitation on the instant invention since the process may be applied to any hydroxylamine susceptible to O—C bond cleavage by heating in an inert atmosphere.

The trisubstituted hydroxylamine starting compounds are known materials although many of the class defined by Formula II have only recently become available. At least two methods are now known for preparing the hydroxylamines, and are herein summarized for the sake of clarity and completeness.

The first method is that of U.S. Patent 3,163,677 (of which one of the present applicants is co-patentee), the entire subject matter of which is incorporated herein by reference. The hydroxylamines of the patent, all of which are suitable for use in the instant process, are prepared by the following generalized reaction:

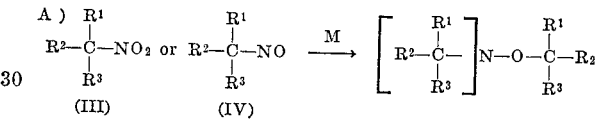

wherein $R^1$, $R^2$ and $R^3$ have the same values as described above and M is an alkali metal such as sodium or potassium. It is further taught in the patent that the resulting hydroxylamines oxidize on exposure to air or other oxidizing medium to N,N-disubstituted, stable, free radical nitroxides, many of which are included in the definition of the products of the present inventive process. This oxidizing process is, of course, essentially distinguishable from the instant process which is conducted in an inert, non-oxidizing atmosphere, and depends on thermal decomposition of the hydroxylamine O—C bond to form the nitroxide rather than oxidative removal of one of the three

groups from the trisubstituted hydroxylamine. Suitable tertiary nitro (III) and nitroso (IV) compounds which may be employed are included in the following non-limiting listing: 2-nitro-2-methyl propane, 2-nitro-2-methyl butane, 2-nitro-2,3-dimethyl butane, 2-nitro-2-methyl pentane, 2-nitro-2,4-dimethyl pentane, 2-nitro-2,4,4-trimethyl pentane, 2-nitro-2,5-dimethyl hexane, 2-nitro-2,6-dimethyl heptane, 3-nitro-3-ethyl pentane, 1-nitro-1-methyl cyclopentane, 1-nitro-1-methyl cyclohexane, 1-nitro-1,4-dimethyl cyclohexane and the like; 2-nitro-2-phenyl propane, 2-nitroso-2-methyl propane and the like. Higher tertiary nitroalkanes may be readily obtained by the procedure of Kornblum, Clutter and Jones, J. Am. Chem. Soc., 78, 4003 (1956). Similarly, other tertiary nitrosoalkanes may be prepared by the method outlined by Emmons, J. Am. Chem. Soc., 79, 6522 (1957).

The second method for preparing suitable trisubstituted hydroxylamine starting compounds may be represented as follows:

(B)

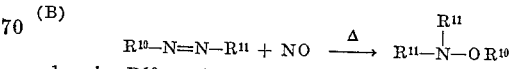

wherein $R^{10}$ and $R^{11}$ are as defined above. It will be seen from the equation that this method is the more general route to the trisubstituted hydroxylamines since $R^{10}$ and $R^{11}$ include all of the substituents described above for method (A). The process is conducted by passing nitrous oxide gas through a reaction mixture containing the azo compound, at substantially atmospheric pressure or under pressure, in an inert atmosphere and at from about 50° C. to 250° C. until hydroxylamine is formed. Thereafter the hydroxylamine is isolated by conventional means and pyrolyzed according to the present invention to form the stable, free radical nitroxides.

Of general applicability in method (B) are azo compounds which have an acyclic azo (—N=N—) group bonded to different, i.e. distinct or separate, carbons which are non-aromatic, i.e., aliphatic or cycloaliphatic, both of which are tertiary, i.e., do not contain hydrogen atoms on these carbon atoms which are bonded to the azo nitrogen atoms. The more active and therefore the preferred azo compounds within this class are those in which one or both tertiary carbon atoms have attached to them through carbon a radical containing an oxygen, sulfur or nitrogen atom. Symmetrical azo compounds having as the negative group attached to the tertiary carbon atoms a nitrile, carboxamide or ester group which react readily at low temperatures are preferred.

Azo compounds which are symmetrical and accordingly have two tertiary aliphatic or alicyclic carbons, i.e. a tertiary carbon aliphatic or alicyclic in character attached to each of the azo nitrogens, are exemplified by the following non-limiting listing: α,α'-azodiisobutyronitrile, α,α' - azobis(α,γ - dimethylvaleronitrile), α,α'-azobis(α-methylbutyronitrile), α,α' - azobis(α-ethylbutyronitrile), α,α' - azobis(α - methylenanthonitrile), α,α' - azobis(α-phenylpropionitrile), α,α' - azobis(α-cyclopropylpropionitrile), α,α'-azobis(α-cyclohexylpropionitrile), α,α'-azobis(α - isopropyl-β-methylbutyronitrile), α,α'-azobis(α,γ-dimethylcapronitrile), α,α' - azobis(α-n-butylcapronitrile), α,α' - azobis(α-isobutyl-γ-methylvaleronitrile), α,α'-azobis(α-methyl-γ-carboxybutyronitrile) and its salts, e.g., the disodium salt, 1,1'-azodicyclohexanecarbonitrile, 1,1'-azodicycloheptanecarbonitrile, 1,1'-azobis(3-methylcyclopentanecarbonitrile), 1,1' - azobis(2,4-dimethylcyclohexanecarbonitrile), 1,1' - azodicamphanecarbonitrile (the azonitrile derived from camphor) and the corresponding amides and esters of the above in which the nitrile group or groups are replaced by amide and/or ester groups, e.g., to give α,α'-azodiisobutyramide, α,α'-azobis(α,γ-dimethylvaleramide), α,α' - azobis(α-cyclopropylpropionamide), 1,1'-azodicyclohexanecarboxamide, α,α'-azobis(N-ethylisobutyramide), dimethyl 1,1'-azodicyclohexanecarboxylate, and dimethyl, diethyl, and dihexyl α,α'-azodiisobutyrate. Preferably lower alkyl esters, e.g., of the 1–6 carbon alcohols are used. The azonitrile can be converted to amides and esters by known procedures, e.g., by formation of the iminoether hydrochloride by reaction with dry hydrogen chloride and an anhydrous alcohol followed by reaction with ammonia or the appropriate hydrogen-bearing amine, or with water.

Because of the ease of preparation from available ketones, the nitriles of α,α'-azodialkanoic acids and the lower (1 to 6 carbon) alkyl esters and the amides of such acids are particularly preferred.

In general, the more useful azo compounds have aliphatic or cycloaliphatic radicals of 4–11 carbons on each of the azo nitrogens and usually have carbon and hydrogen or carbon, hydrogen and oxygen as the elements in the radical excepting the negative substituent on the tertiary carbon.

Other suitable azo compounds which may be employed in the preparation of the hydroxylamine starting compounds according to method (B) are included in the following non-limiting listing: 1,1'-azobis(1-chloro-1-phenylethane), 1,1'-azobis[1-(p-bromophenyl)-1-chloroethane], 2,2'-azodi-2-propanol diacetate, 2,2'-azobis (2-thiocyanatopropane), 2,2'-azobis [2-(phenylthio)propane], and 2,2'-azobis[2-(2-benzothiazolylthio)propane]. Such immediately mentioned azo compounds and others which are also capable of utilization are described in: S. Goldschmidt and B. Acksteiner, Ann., 618, 173–185 (1958); E. Benzing, Ann., 631, 1–9 (1960); E. Benzing, Ann., 631, 10–21 (1960); E. Benzing, Agnew. Chem., 72, 709 (1960); and U.S. Patent 2,471,959 to Hunt.

Further details of preparation of hydroxylamine starting materials are described, for example, in B. A. Gingras et al., J. Chem. Soc. 1920 (1954), L. Phillips, Proceedings of Chem. Soc. 204 (1961) and A. Maschke et al., J. Am. Chem. Soc. 85, 1878 (1963). These articles are incorporated herein by reference.

The pyrolysis of the trisubstituted hydroxylamines is effected in an inert atmosphere at a temperature of from about 100° C. to 250° C., preferably from about 130° C. to 200° C., over from about several minutes to several hours, preferably 5 to 30 minutes. Any apparatus suitable for heating the hydroxylamine while maintaining an inert atmosphere may be used. For example, a reaction vessel containing the hydroxylamine under an inert atmosphere may be placed in the cavity of an electron spin resonance (E.S.R.) spectrophotometer and there pyrolyzed while observing the spectrum for appearances of the nitroxide product.

The inert atmosphere is conveniently provided by passing nitrogen gas or other inert gas such as helium and the like through or over the reaction mixture. The inert gas may also be employed as a "sweeping gas" to carry the nitroxide product over into suitable receivers such as condensers or free radical traps.

The pyrolysis is best conducted at substantially atmospheric pressure although subatmospheric or superatmospheric pressures may also be employed.

The reaction mixture following pyrolysis will generally contain a mixture of products of which a substantial amount, depending on duration of pyrolysis and stability of starting hydroxylamine, will be di-substituted nitroxide. This product may then be separated by conventional means or, depending on the end use, may be employed in admixture with byproducts.

The N,N-disubstituted nitroxide products are stable free radicals and as such are useful as polymerization inhibitors, antiknock agents in fuels, antioxidants for rubbers and other compounds, such as olefins, normally subject to atmospheric oxidation. Additionally, the N,N-disubstituted nitroxides of the present invention may be used as traps for reactive free radicals and as paramagnetic standards for electron spin resonance spectrometry.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

*Example 1*

A sample of freshly distilled tri-t-butyl-hydroxylamine is placed under a nitrogen atmosphere in a reaction vessel connected to a gas burette. The reaction vessel is immersed in a bath preheated to 150° C. and kept at this temperature while samples of the decomposing residue as well as the evolved gaseous products are withdrawn at various intervals for vapor phase chromatographic and mass spectrometric analyses. Within 16 minutes from the start of the heating process, 25% of the residue consists of di-t-butylnitroxide.

*Example 2*

A sample of tris-2-cyanopropylhydroxylamine, purified by crystallization from cyclohexane, is placed into a reaction vessel flushed with nitrogen and heated to 160° C.

A nitrogen sweep is maintained through the vessel and the exhaust gas is passed through condensers cooled with a slush of Dry Ice and acetone. After several hours, the molten reactant in the flask largely disappears, and the traps are allowed to warm to room temperature. As shown by electron spin spectroscopy a considerable concentration of di-2-cyanoptopylnitroxide is condensed in the cold traps.

*Example 3*

A sample of tris-2-cyanopropylhydroxylamine dissolved in benzene is dropped into a tubular reaction 1″ x 30″ packed with glass beads. The reaction is maintained at a temperature of 250° C. and the residence time of the hydroxylamine in the reactor is adjusted to 8–10 seconds by controlling the flow rate of nitrogen through the tube. The exit end of the tube is connected to cold traps which collect the products. Substantial amounts of di-2-cyanopropylnitroxide are found in the condensate products by electron spin spectroscopy assay.

*Example 4*

A sample of tris(2-carbomethoxy-2-propyl)hydroxylamine dissolved in benzene is placed in a vessel heated to 100° C. The vessel is connected by a stopcock to a tubular reactor as in Example 3. This tube is heated to 300° C., maintained in vacuo at 1 mm. Hg pressure and is exhausted into a vessel cooled to —80° C. with Dry Ice and acetone. The hydroxylamine solution is allowed to enter the tube dropwise. After addition is complete, the collection vessel is warmed to room temperature and found to contain substantial amounts of di-2-carbomethoy-2-propylnitroxide.

*Example 5*

A sample of N,N-di-t-butyl-O-2-cyanopropylhydroxylamine is heated at 110° C. in a pressure vessel under nitrogen at autogenous pressure for 3 hours. After cooling and venting, the product is found to consist largely of di-t-butylnitroxide.

We claim:

1. A process for preparing stable, free radical nitroxides of the formula:

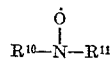

which comprises pyrolyzing in an inert reaction medium a hydroxylamine of the formula:

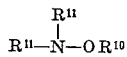

wherein $R^{10}$ is selected from the group consisting of

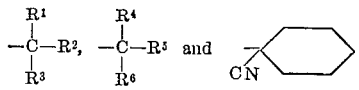

wherein:

$R^1$, $R^2$ and $R^3$ are alkyl;

$R^4$ and $R^5$ are selected from the group consisting of alkyl, phenyl and halogen-substituted phenyl;

$R^6$ is selected from the group consisting of —CN, —COOR$^7$, —CONH$_2$, halogen, —SR$^8$ and —OR$^9$;

$R^7$ is selected from the group consisting of alkyl and phenyl;

$R^8$ is selected from the group consisting of —CN, —COCH$_3$, phenyl,

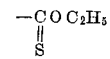

and

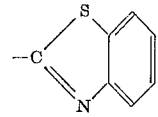

and $R^9$ is selected from the group consisting of —COCH$_3$ and —COC$_2$H$_5$;

and wherein $R^{11}$ is selected from the group consisting of $R^{10}$ and phenyl.

2. The process of claim 1 wherein said pyrolysis is conducted at a temperature of from about 100° C. to 250° C.

3. A process for preparing di-t-butylnitroxide which comprises pyrolyzing tri-t-butylhydroxylamine in an inert reaction medium.

4. A process for preparing di-2-cyanopropylnitroxide which comprises pyrolyzing tris-2-cyanopropylhydroxylamine in an inert reaction medium.

5. A process for preparing di-2-carbomethoxy—2-propyl nitroxide which comprises pyrolyzing tris(2—carbomethoxy-2-propyl)hydroxylamine in an inert reaction medium.

6. A process for preparing di-t-butylnitroxide which comprises pyrolyzing N,N-di-t-butyl-O-2-cyanopropyl-hydroxylamine in an inert reaction medium.

References Cited

UNITED STATES PATENTS 3,163,677  12/1964  Hoffmann et al. _____ 260—583
3,253,015  5/1966   Hoffmann et al. ____ 260—456.5

OTHER REFERENCES

Hoffmann et al.: J.A.C.S., 86 pp. 631–639 (1964).
Hoffmann et al.: J.A.C.S., 86, pp. 639–646 (1964).
Hoffmann et al.: J.A.C.S., 86, pp. 646–650 (1964).

JOSEPH P. BRUST, *Primary Examiner.*